US009827753B2

United States Patent
Son et al.

(10) Patent No.: US 9,827,753 B2
(45) Date of Patent: Nov. 28, 2017

(54) JIG ASSEMBLY, LAMINATING APPARATUS, AND LAMINATING METHOD USING THE LAMINATING APPARATUS

(71) Applicants: Samsung Display Co., Ltd., Yongin, Gyeonggi-Do (KR); Yodogawa Medec Co., Ltd., Suita-Shi, Osaka (JP)

(72) Inventors: Yang Han Son, Cheonan-si (KR); Jong Hwan Kim, Seoul (KR); Young Sik Kim, Cheonan-si (KR); Kyung Su Lee, Cheonan-si (KR)

(73) Assignees: Samsung Display Co., Ltd., Yongin-si (KR); Yodogawa Medec Co., Ltd., Suita-shi (JP)

(*) Notice: Subject to any disclaimer, the term of this patent is extended or adjusted under 35 U.S.C. 154(b) by 45 days.

(21) Appl. No.: 13/947,937

(22) Filed: Jul. 22, 2013

(65) Prior Publication Data
US 2014/0299269 A1 Oct. 9, 2014

(30) Foreign Application Priority Data
Apr. 3, 2013 (KR) .......................... 10-2013-0036497

(51) Int. Cl.
*A61F 13/15* (2006.01)
*B29C 65/00* (2006.01)
(Continued)

(52) U.S. Cl.
CPC ............ *B32B 37/10* (2013.01); *B30B 15/062* (2013.01); *B29C 66/8161* (2013.01);
(Continued)

(58) Field of Classification Search
CPC ... B32B 37/00; B32B 37/0007; B32B 37/003; B32B 37/0046; B32B 37/10;
(Continued)

(56) References Cited

U.S. PATENT DOCUMENTS 5,129,827 A * 7/1992 Hoshi et al. .................. 438/457
7,736,459 B2  6/2010 Matsumura
(Continued)

FOREIGN PATENT DOCUMENTS

| CN | 101371346 | 2/2009 |
| CN | 102066110 | 5/2011 |

(Continued)

OTHER PUBLICATIONS

Continental Sports product sheet: Springboard—School's Reuther model. http://www.continentalsports.co.uk/springboards/98-springboard---school-s-reuther-model.html.*
(Continued)

*Primary Examiner* — Philip Tucker
*Assistant Examiner* — Brian R Slawski
(74) *Attorney, Agent, or Firm* — H.C. Park & Associates, PLC

(57) ABSTRACT

Provided are laminating apparatus and method. A laminating apparatus includes a jig assembly, which includes the first jig and an elastic member, and a second jig. A laminating method includes placing a first plate on a jig assembly, placing a second plate on a second jig which is placed to face the first jig, bringing the second plate into contact with the adhesive layer by making the jig assembly and the second jig approach each other, and, attaching the first plate and the second plate to each other by making the jig assembly and the second jig approach closer to each other. The jig assembly includes a first jig and an elastic member which comprises a top portion and sloping portions sloping downward from the top portion. An adhesive layer is disposed between the first plate and the second plate.

12 Claims, 22 Drawing Sheets

(51) Int. Cl.
<table>
<tr><td>*B32B 37/00*</td><td>(2006.01)</td></tr>
<tr><td>*B31F 5/00*</td><td>(2006.01)</td></tr>
<tr><td>*B65H 29/00*</td><td>(2006.01)</td></tr>
<tr><td>*B29C 65/08*</td><td>(2006.01)</td></tr>
<tr><td>*G02F 1/1339*</td><td>(2006.01)</td></tr>
<tr><td>*B32B 37/10*</td><td>(2006.01)</td></tr>
<tr><td>*B30B 15/06*</td><td>(2006.01)</td></tr>
<tr><td>*B32B 37/12*</td><td>(2006.01)</td></tr>
<tr><td>*G02F 1/13*</td><td>(2006.01)</td></tr>
<tr><td>*G02F 1/1333*</td><td>(2006.01)</td></tr>
</table>

(52) U.S. Cl.
CPC .............. *B32B 2037/1253* (2013.01); *B32B 2310/0831* (2013.01); *B32B 2457/20* (2013.01); *G02F 1/1303* (2013.01); *G02F 1/133305* (2013.01)

(58) Field of Classification Search
CPC . B32B 38/00; B32B 38/0012; B32B 38/1866; B32B 2457/20; B32B 17/00; B32B 17/06; B32B 17/10807; B32B 17/10889; B32B 17/10816; B32B 17/10825; B29C 65/00; B29C 65/48; B29C 65/78; B29C 65/7802; B29C 65/7841; B29C 66/00; B29C 66/01; B29C 66/342; B29C 66/345; B29C 66/40; B29C 66/81; B29C 66/816; B29C 66/8161; H01L 2924/00; B30B 15/061; G02F 1/1303
USPC ......... 156/60, 160, 163, 295, 323, 349, 443, 156/538, 539, 556, 580, 581; 349/187, 349/190; 257/E51.001, E51.002
See application file for complete search history.

(56) References Cited

U.S. PATENT DOCUMENTS

<table>
<tr><td>8,196,636 B2</td><td></td><td>6/2012</td><td>Sung et al.</td><td></td></tr>
<tr><td>2002/0062921 A1</td><td></td><td>5/2002</td><td>Muffler</td><td></td></tr>
<tr><td>2009/0277578 A1</td><td>*</td><td>11/2009</td><td>Sung et al.</td><td>................... 156/285</td></tr>
<tr><td>2009/0314437 A1</td><td>*</td><td>12/2009</td><td>Matsumura</td><td>................... 156/580</td></tr>
<tr><td>2012/0186741 A1</td><td>*</td><td>7/2012</td><td>Lake</td><td>.................. B32B 38/1866<br>156/306.3</td></tr>
</table>

FOREIGN PATENT DOCUMENTS

<table>
<tr><td>DE</td><td>3231033 A1</td><td>*</td><td>2/1984</td><td>............... A63B 5/08</td></tr>
<tr><td>DE</td><td>3602784 A1</td><td>*</td><td>3/1987</td><td>............... A63B 5/08</td></tr>
<tr><td>FR</td><td>EP 1314454 A1</td><td>*</td><td>5/2003</td><td>............... A63B 5/08</td></tr>
<tr><td>KR</td><td>10-2006-0023264 A</td><td></td><td>3/2006</td><td></td></tr>
<tr><td>KR</td><td>10-0940712 B1</td><td></td><td>2/2010</td><td></td></tr>
<tr><td>KR</td><td>10-2011-0081706 A</td><td></td><td>7/2011</td><td></td></tr>
<tr><td>KR</td><td>10-2012-0063611 A</td><td></td><td>6/2012</td><td></td></tr>
</table>

OTHER PUBLICATIONS

Continental Sports photograph: Springboard—School's Reuther model. http://www.continentalsports.co.uk/98-3321-thickbox/springboard---school-s-reuther-model.jpg.*
Janssen Fritsen product sheet: Springboard competition 'Soft.' http://www.janssen-fritsen.com/product-detail-en/springboard-competition-soft/.*
Janssen Fritsen photograph: Springboard competition 'Soft.' http://www.janssen-fritsen.com/system/html/1411704%20BDSA%20%201411700__20254-2a50b9a9.png.*
Chinese Office Action issued by SIPO dated Dec. 29, 2016 in corresponding Chinese Patent Application No. 201410127035.1 which also claims Korean Patent Application No. 10-2013-0036497 as its priority application, together with its English translation.

* cited by examiner

JIG ASSEMBLY, LAMINATING APPARATUS, AND LAMINATING METHOD USING THE LAMINATING APPARATUS

CLAIM OF PRIORITY

This application claims priority from Korean Patent Application No. 10-2013-0036497 filed on Apr. 3, 2013 in the Korean Intellectual Property Office, the disclosure of which is incorporated herein by reference in its entirety.

BACKGROUND OF THE INVENTION

Field of the Invention

The present invention relates to a jig assembly, a laminating apparatus, and a laminating method using the laminating apparatus.

Description of the Related Art

Currently, the display market is rapidly being dominated by flat panel displays (FPDs) that can be easily made to have a large area and can be made thinner and lighter.

Examples of the FPDs include liquid crystal displays (LCDs), plasma display panels (PDPs), and organic light-emitting displays (OLEDs). Since these conventional LCDs, PDPs, and OLEDs use a glass substrate, they are lacking in flexibility and thus have limited applications and uses.

In this regard, flexible displays that can be bent, because it uses a flexible substrate made of a flexible material (e.g., plastic, foil, etc.) instead of a glass substrate, are being actively developed as next-generation displays.

Accordingly, various apparatuses for testing or manufacturing a flexible substrate or a flexible panel are being required.

SUMMARY OF THE INVENTION

Aspects of the present invention provide a jig assembly which prevents the formation of creases on an adhesive layer in the process of laminating a first plate and a second plate.

Aspects of the present invention also provide a laminating apparatus which improves product productivity by reducing a defect rate during the process of laminating a first plate and a second plate.

Aspects of the present invention also provide a laminating method which improves process efficiency by reducing a product defect rate.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided the laminating apparatus which includes a jig assembly, which includes the first jig and an elastic member disposed on the first jig, and a second jig which is separated from the first jig by a predetermined distance and faces the first jig. A top surface of the elastic member includes a top portion and sloping portions sloping downward from the top portion.

According to another aspect of the present invention, there is provided a laminating method which comprising placing a first plate on a jig assembly, placing a second plate on a second jig which is placed to face the first jig, bringing the second plate into contact with the adhesive layer by making the jig assembly and the second jig approach each other and, attaching the first plate and the second plate to each other by making the jig assembly and the second jig approach closer to each other in a state where the second plate and the adhesive layer are in contact with each other. The jig assembly comprises a first jig and an elastic member which comprises a top portion and sloping portions sloping downward from the top portion. An adhesive layer is disposed between the first plate and the second plate.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
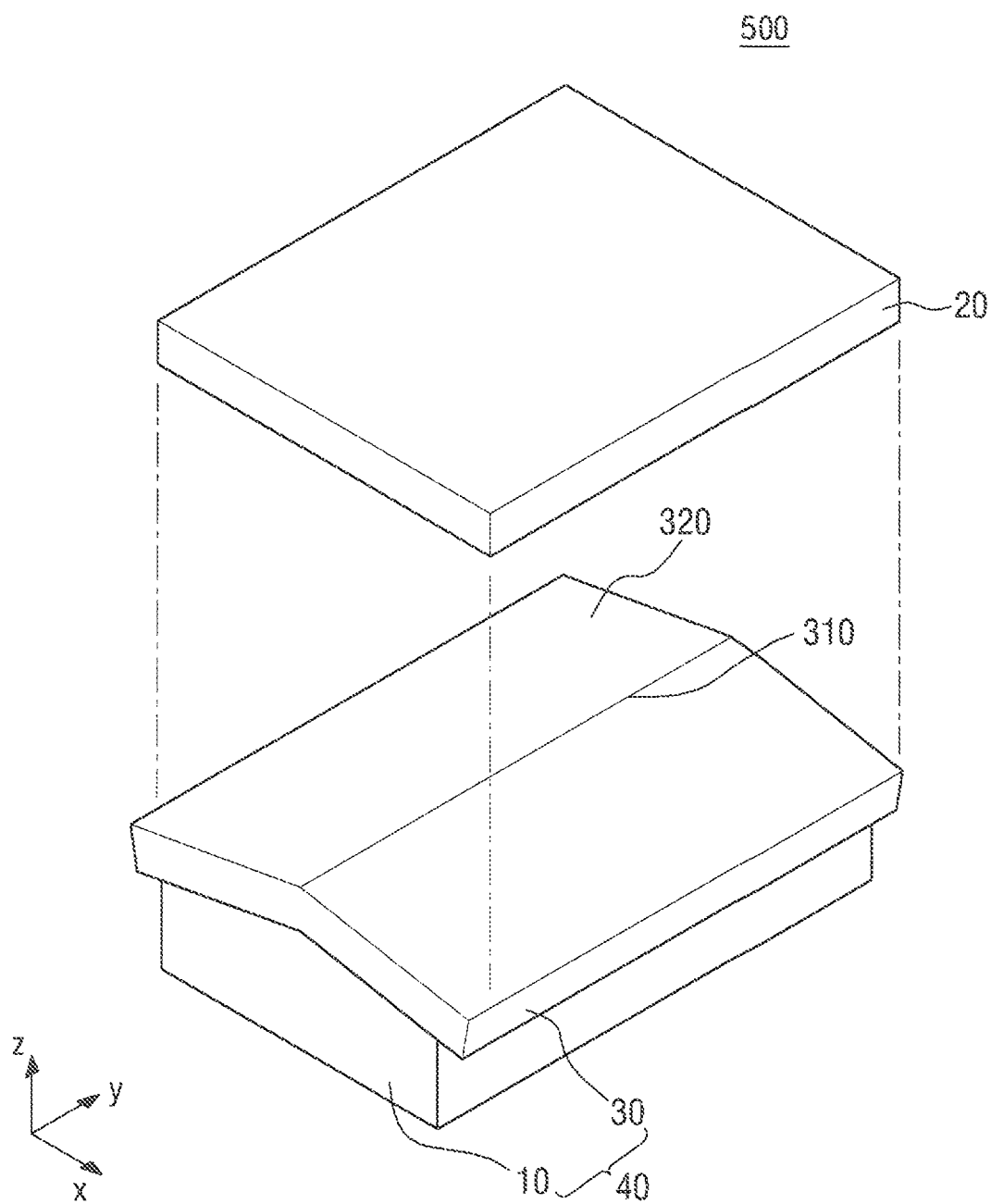
FIG. 1 is a perspective view of a laminating apparatus according to an embodiment of the present invention.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the present invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments of the present invention will be described with reference to the attached drawings.

Figure 2:
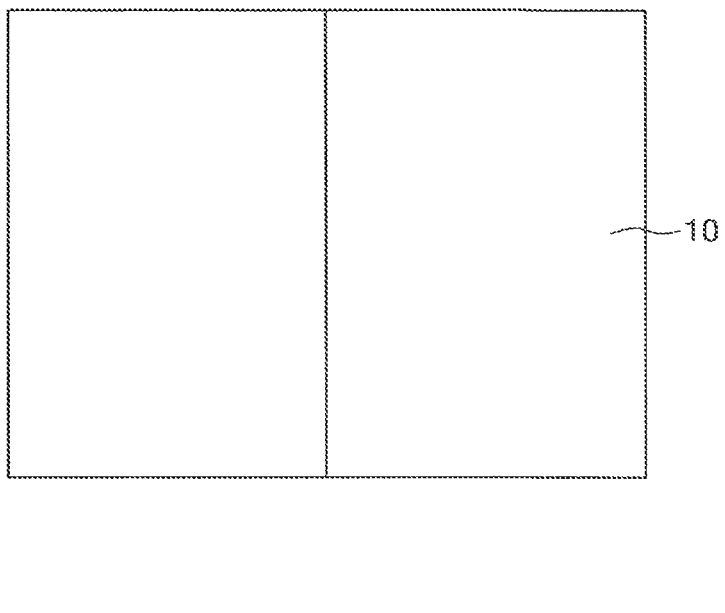
FIG. 2 is a plan view of a first jig employed in the laminating apparatus of FIG. 1.

FIG. 1 is a perspective view of a laminating apparatus 500 according to an embodiment of the present invention. FIG. 2 is a plan view of a first jig 10 employed in the laminating apparatus 500 of FIG. 1.

Referring to FIGS. 1 and 2, the laminating apparatus 500 according to the current embodiment includes a jig assembly 40, which includes the first jig 10 and an elastic member 30, and a second jig 20. The jig assembly 40 includes the first jig 10 and the elastic member 30 disposed on the first jig 10. A planar shape of the first jig 10 may be a quadrangle as shown in FIG. 2.

In an exemplary embodiment, the first jig 10 may include a top portion and sloping portions which slope downward from the top portion on both sides of the top portion.

The elastic member 30 is disposed on the first jig 10. The elastic member 30 may completely cover the first jig 10. The elastic member 30 may include one or more materials selected from the group consisting of rubber, urethane, and synthetic resin. However, the material that forms the elastic member 30 is not limited to the above materials, and all elastic materials that have been developed and commercialized or are realizable depending on future technological developments are applicable.

The elastic member 30 may have elasticity and resilience. That is, the elastic member 30 may be deformed when a force is applied to the elastic member 30 and may return to its original state when the force is removed.

A top surface of the elastic member 30 may have a top portion 310 and sloping portions 320 which slope downward from the top portion on both sides of the top portion 310. In an exemplary embodiment, the elastic member 30 may have a uniform thickness. When the elastic member 30 having the uniform thickness is disposed on the first jig 10 having the top portion 10A and the sloping portions 10B (FIG. 3), the elastic member 30 may be bent along the shape of a top surface of the first jig 10. In this case, the thickness T1 of the jig 10 may not be uniform while the thickness T3 of the elastic member 30 may be uniform. Accordingly, the top surface of the elastic member 30 may have the top portion 310 and the sloping portions 320. In some embodiments, the top portion of the first jig 10 and the top portion 310 of the elastic member 30 may overlap each other, and the sloping portions of the top surface of the first jig 10 and the sloping portions 320 of the top surface of the elastic member 30 may be parallel to each other.

The second jig 20 may be separated from the jig assembly 40 by a predetermined distance and may face the jig assembly 40.

The second jig 20 may provide a space in which a second plate to be described later is placed. A planar shape of the second jig 20 may be a quadrangle. In another embodiment, the second jig 20 may have one or more bent portions. This will be described in detail later with reference to FIGS. 20 through 22.

In an exemplary embodiment, the jig assembly 40 and/or the second jig 20 may be moved vertically to approach each other. To this end, the laminating apparatus 500 may further include a driver which moves the jig assembly 40 and/or the second jig 20. The driver may include, e.g., a motor or an actuator.

A method of laminating plates using the laminating apparatus 500 will now be described. FIGS. 3 through 5 and 7 are cross-sectional views illustrating a laminating process performed using the laminating apparatus 500 of FIG. 1. FIG. 6 is a plan view illustrating the process of FIG. 5.

Figure 3:
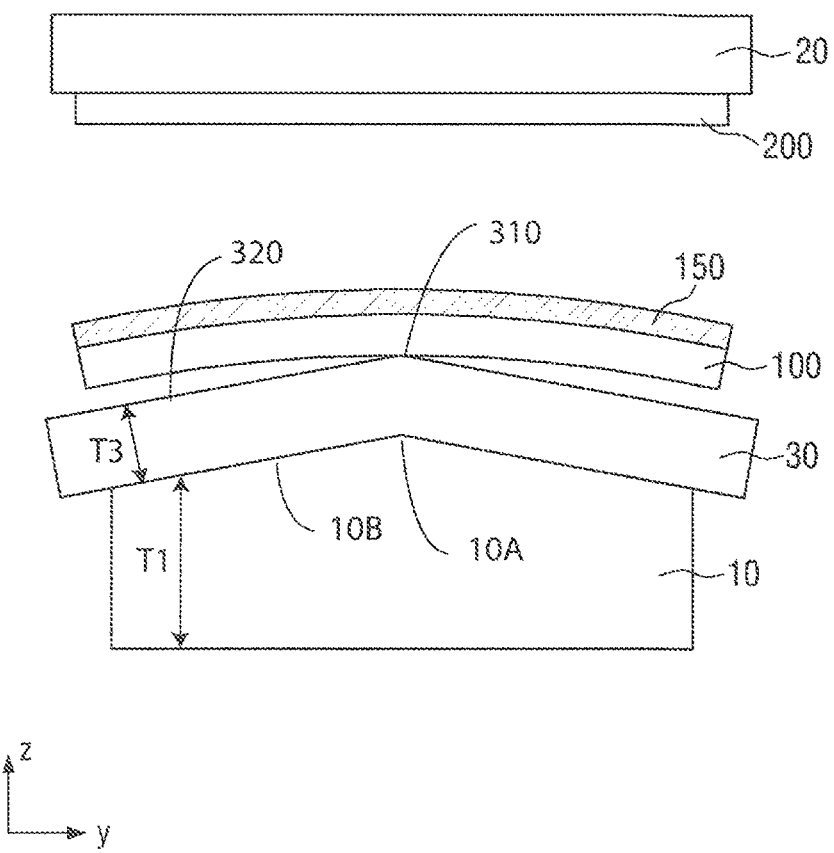
FIG. 3 is a cross-sectional view illustrating a laminating process performed using the laminating apparatus of FIG. 1.

Referring to FIG. 3, a first plate 100 and a second plate 200 to be laminated are prepared. The first plate 100 may be a flexible substrate or a flexible panel. The flexible panel may be, e.g., an organic light-emitting diode (OLED) panel. The second plate 200 may be a flexible substrate or a flexible panel or may be a rigid substrate or a rigid panel. An example of the rigid substrate may be a window formed of glass or plastic.

The first plate 100 is placed on the jig assembly 40. The first plate 100 is supported by the elastic member 30. If the elastic member 30 includes the top portion 310 and the sloping portions 320, a bottom surface of the first plate 100 may contact the top portion 310 of the elastic member 30. That is, the top portion 310 and the bottom surface of the first plate 100 may line-contact or surface-contact each other.

If the first plate 100 is a flexible substrate or a flexible panel, both sides of the first plate 100 may be bent downward from the top portion 310 of the elastic member 30 due to gravity or other external forces. In an exemplary embodiment, both sides of the first plate 100 may be placed to slope downward from the top portion 310 of the elastic member 30. Further, the first plate 100 may be placed in the shape of an upwardly convex parabola having the top portion 310 of the elastic member 30 as an inflection point.

Even if the first plate 100 is bent downward from the top portion 310 of the elastic member 30, both sides of the bent first plate 100 may be separated from the sloping portions 320 of the elastic member 30. In other words, there may be a gap between both sides of the bent first plate 100 and the sloping portions 320 of the elastic member 30. In some embodiments, the gap between the first plate 100 and the sloping portions 320 of the elastic member 30 may increase as approaching the outer edge of the elastic member 30 from the top portion 310. However, the present invention is not limited thereto.

An adhesive layer 150 may be placed on the first plate 100. The adhesive layer 150 may be formed of a light transmitting material and may include various adhesives. For example, the material that forms the adhesive layer 150 may be a thermosetting adhesive or a UV curing adhesive. However, the present invention is not limited thereto, and a double-sided, optically clear adhesive (OCA) tape or an optically clear resin (OCR) tape can also be used. The adhesive layer 150 may have substantially the same thickness across the whole surface of the first plate 100. If the first plate 100 is bent on both sides of the top portion 310 of the elastic member 30, the adhesive layer 150 may also be bent in the same manner.

The adhesive layer 150 may be formed on the first plate 100 and then placed on the elastic member 30 together with the first plate 100. Alternatively, the first plate 100 may be placed on the elastic member 30 and then the adhesive layer 150 may be formed on the first plate 100. In FIG. 3, the adhesive layer 150 is placed on the first plate 100. However, the position of the adhesive layer 150 is not limited thereto, and the adhesive layer 150 may also be placed on the second plate 200.

The second plate 200 is placed on the second jig 20 to face the first plate 100. The second plate 200 may have a flat bottom surface.

Figure 4:
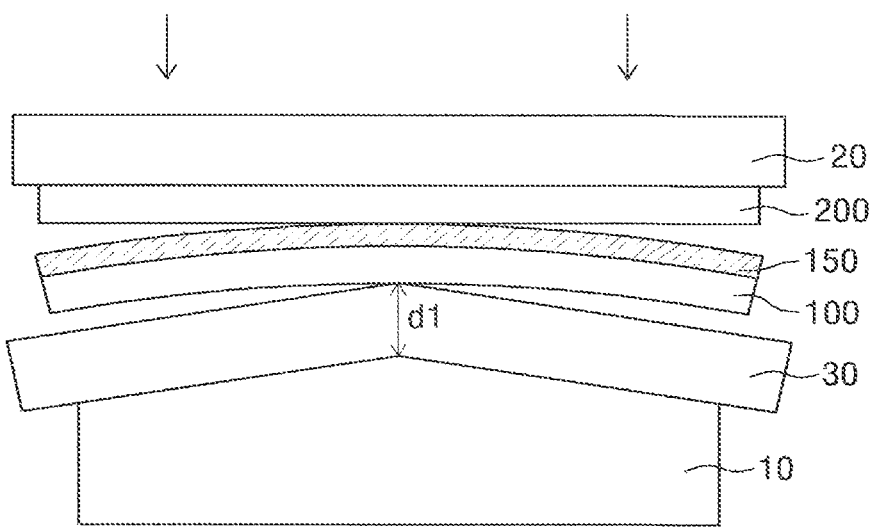
FIG. 4 is a cross-sectional view illustrating the laminating process performed using the laminating apparatus of FIG. 1.
Figure 4:
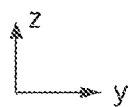

Referring to FIG. 4, the jig assembly 40 and/or the second jig 20 are moved vertically to approach each other. For example, the jig assembly 40 and/or the second jig 20 may be moved by driving the driver including a motor or an actuator. In the current embodiment, the second jig 20 is moved downward to approach the jig assembly 40.

When the second jig 20 descends toward the jig assembly 40, the second plate 200 disposed on the second jig 20 may contact the adhesive layer 150 disposed on the first plate 100. Here, if the first plate 100 and the adhesive layer 150 disposed on the first plate 100 are bent downward from the top portion 310 of the elastic member 30 as described above, the second plate 200 first contacts a portion (i.e., the highest portion) of the adhesive layer 150 disposed on the top portion 310 of the elastic member 30. In this case, the second plate 200 may line-contact the adhesive layer 150 disposed on the first plate 100. A tangent line defined by a portion where the second plate 200 first line-contacts the adhesive layer 150 may overlap the top portion 310 of the elastic member 30.

A first thickness d1 of the elastic member 30 disposed on the top portion of the first jig 10, before the second plate 200 begins to apply pressure in earnest to the adhesive layer 150, may be substantially equal to a thickness of the elastic member 30 before the second plate 200 line-contacts the adhesive layer 150 as the second jig 20 descends.

Figure 5:
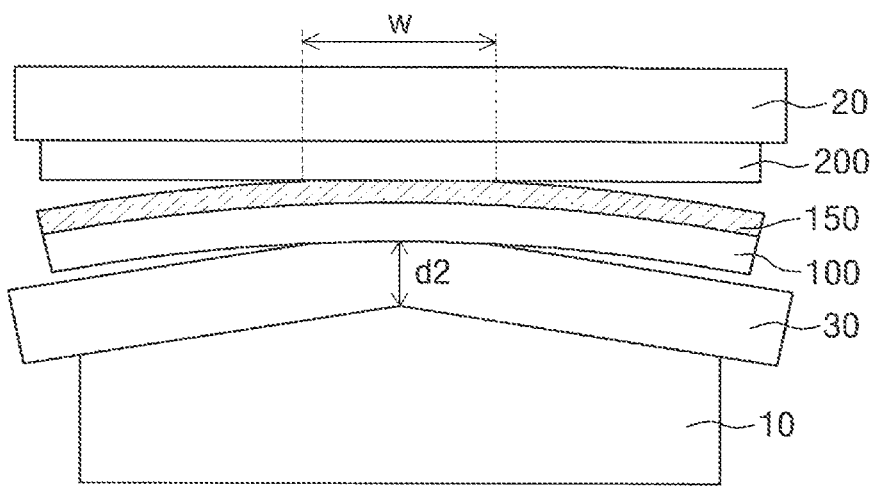
FIG. 5 is a cross-sectional view illustrating the laminating process performed using the laminating apparatus of FIG. 1.
Figure 5:
Figure 6:
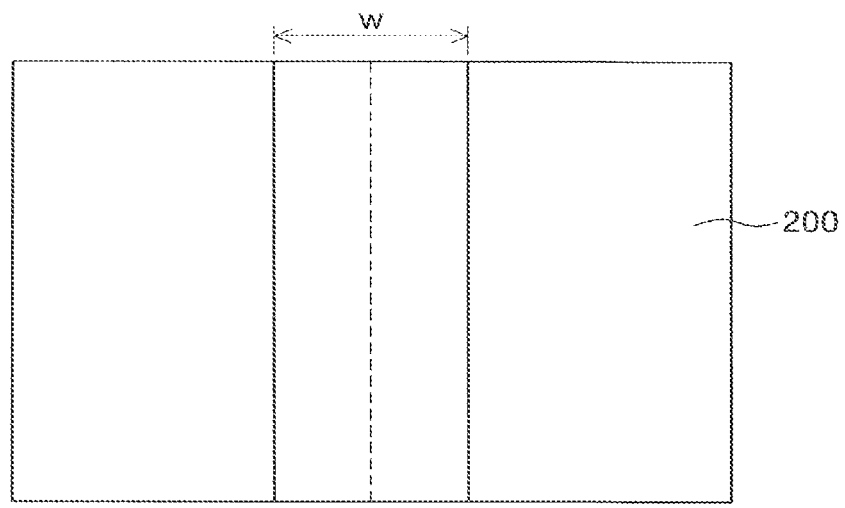
FIG. 6 is a plan view illustrating the process of FIG. 5.

Referring to FIG. 5, when the second jig 20 descends further such that the second plate 200 applies more pressure to the adhesive layer 150, the thickness of the elastic member 30 placed on the top portion of the first jig 10 may be reduced, and a contact area between the second plate 200 and the adhesive layer 150 may increase. Specifically, when the second plate 200 applies pressure to the adhesive layer 150 and the first plate 100 as the second jig 20 descends further, the first plate 100 may apply pressure to the elastic member 30 as a reaction. As the first plate 100 applies pressure to the elastic member 30, the elastic member 30 may be compressed. Accordingly, the first thickness d1 of the elastic member 30 disposed on the top portion of the first jig 10 may be changed to a second thickness d2 which is smaller than the first thickness d1. Here, both sides of the elastic member 30 to which pressure has not yet been applied may maintain the first thickness d1.

In addition, a contact area between the first plate 100 and the elastic member 30 may expand gradually from the top portion 310 of the elastic member 30 toward both sides of the elastic member 30. That is, the contact between the first plate 100 and the elastic member 30 may change from a line contact to a surface contact. As the contact area between the first plate 100 and the elastic member 30 expands, the contact area between the adhesive layer 150 and the second plate 200 may also expand. Referring to FIG. 6, the contact area between the second plate 200 and the adhesive layer 150 may expand gradually from the top portion 310 of the elastic member 30 toward both sides of the elastic member 30. That is, as the second jig 20 continuously descends, the contact area between the elastic member 30 and the first plate 100 may expand and, at the same time, the contact area between the second plate 200 and the adhesive layer 150 may expand. That is, the contact between the second plate 200 and the adhesive layer 150 may change from a line contact to a surface contact. Since the second plate 200 is attached to the adhesive layer 150 as the contact area between the second plate 200 and the adhesive layer 150 expands gradually, the formation of creases on the adhesive layer 150 can be prevented. The character W in FIG. 6 exemplarily illustrates the expanded width of the contact area between the second plate 200 and the adhesive layer 150.

Figure 7:
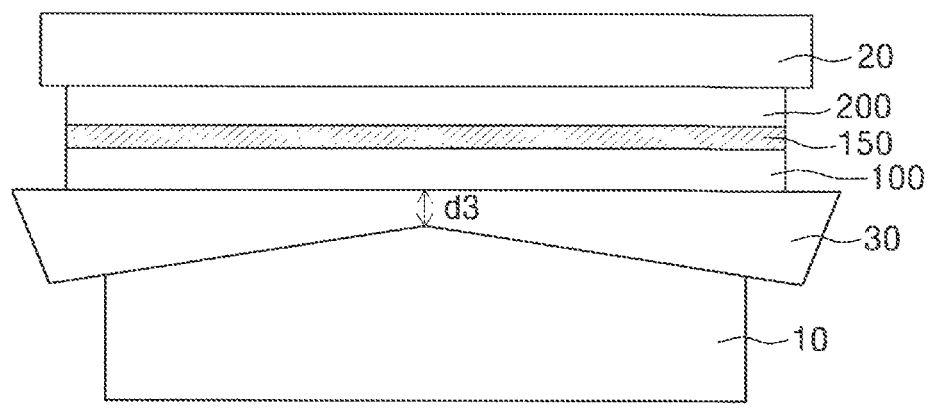
FIG. 7 is a cross-sectional view illustrating the laminating process performed using the laminating apparatus of FIG. 1.

Referring to FIG. 7, as the second jig 20 descends continuously, the first plate 100 applies pressure more forcefully to the elastic member 30. As the pressure applied by the first plate 100 to the elastic member 30 increases, the contact area between the elastic member 30 and the first plate 100 may increase. Finally, the whole bottom surface of the first plate 100 may contact the elastic member 30, thereby completing the lamination of the first plate 100 and the second plate 200.

When the whole bottom surface of the first plate 100 contacts the elastic member 30, the thickness of the elastic member 30 disposed on the top portion of the first jig 10 may be minimized to a third thickness d3. Here, the top surface of the elastic member 30 may be flat, and the bottom surface thereof may have a concave shape corresponding to the shape of the top surface of the first jig 10.

Subsequently, when the second jig 20 ascends and then the laminated structure is obtained, the elastic member 30 may return to its original shape and thickness.

Hereinafter, other embodiments of the present invention will be described. In the following embodiments, elements substantially identical to those described above are indicated by like reference numerals, and thus their description will be omitted or simplified.

Figure 8:
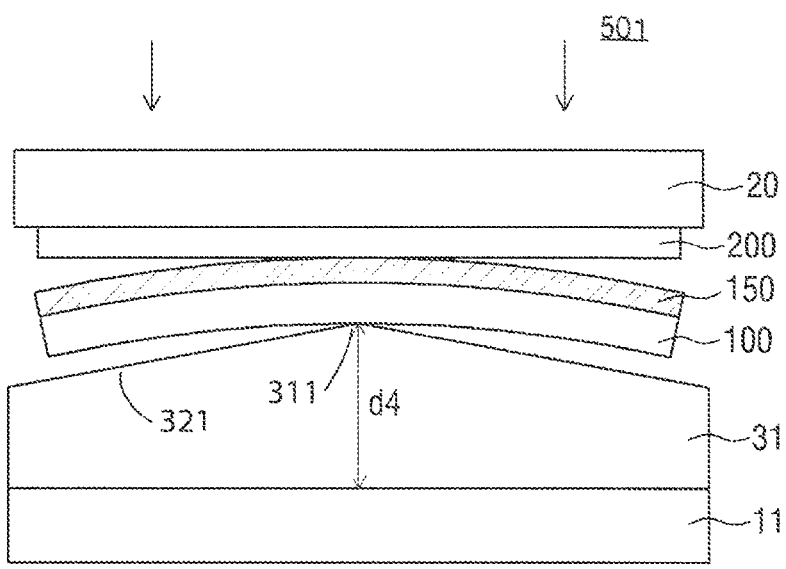
FIG. 8 is a cross-sectional view of a laminating apparatus according to another embodiment of the present invention.
Figure 8:
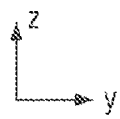
Figure 9:
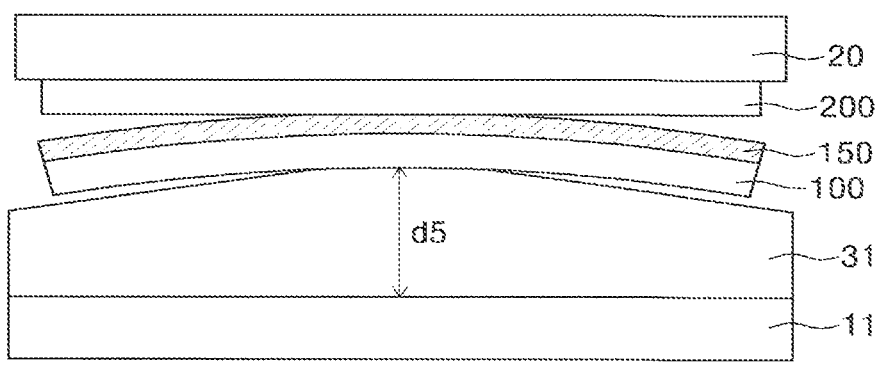
FIGS. 9 and 10 are cross-sectional views illustrating a laminating process performed using the laminating apparatus of FIG. 8.
Figure 10:
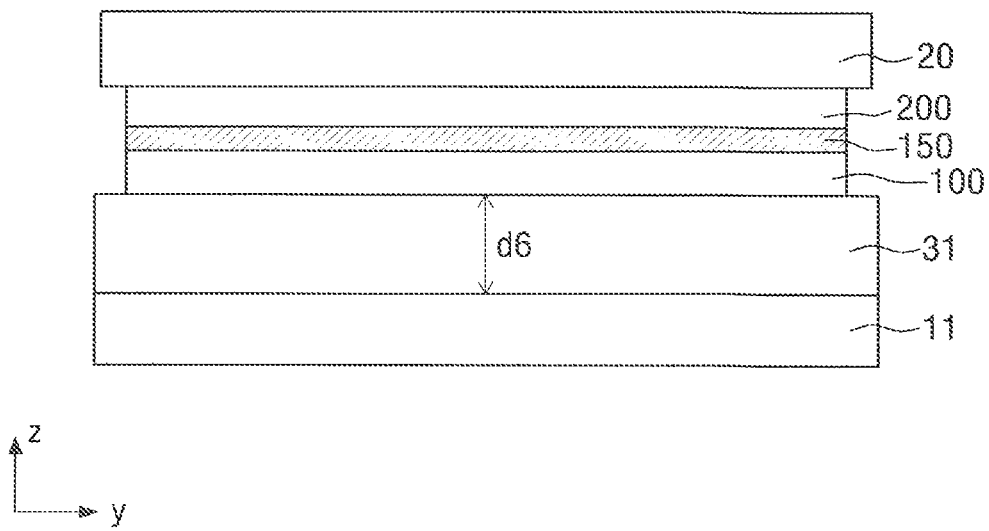

FIG. 8 is a cross-sectional view of a laminating apparatus 501 according to another embodiment of the present invention. FIGS. 9 and 10 are cross-sectional views illustrating a laminating process performed using the laminating apparatus 501 of FIG. 8.

Referring to FIG. 8, the laminating apparatus 501 according to the current embodiment is different from the laminating apparatus 500 according to the embodiment of FIG. 1 in that a top portion of an elastic member 31 is thicker than sloping portions thereof.

As described above, a top surface of the elastic member 31 may include the top portion 311 and the sloping portions 321 which slope downward from the top portion on both sides of the top portion. In an exemplary embodiment, a top surface of a first jig 11 on which the elastic member 31 is placed may be flat. In this case, the elastic member 31 may have a non-uniform thickness so as to have the top portion 311 and the sloping portions 321. That is, the top portion of the elastic member 31 may be thickest, and the thickness of the elastic member 31 may be reduced from the top portion toward both sides of the elastic member 31.

The laminating apparatus 501 according to the current embodiment may operate as follows. If a first plate 100 and an adhesive layer 150 disposed on the first plate 100 are bent downward from the top portion 311 of the elastic member 31 as described above, a second plate 200 first contacts a portion (i.e., the highest portion) of the adhesive layer 150 disposed on the top portion 311 of the elastic member 31. In this case, the second plate 200 may line-contact the adhesive layer 150 disposed on the first plate 100.

A fourth thickness d4 of the elastic member 31 disposed on a top portion of the first jig 11, before the second plate 200 begins to apply pressure in earnest to the adhesive layer 150, may be substantially equal to a thickness of the elastic member 31 before the second plate 200 line-contacts the adhesive layer 150 as a second jig 20 descends.

When the second jig 20 descends further such that the second plate 200 applies more pressure to the adhesive layer 150, the thickness of the top portion 311 of the elastic member 31 placed on the first jig 11 may be reduced, and a contact area between the second plate 200 and the adhesive layer 150 may increase. Specifically, when the second plate 200 applies pressure to the adhesive layer 150 and the first plate 100 as the second jig 20 descends further, the first plate 100 may apply pressure to the elastic member 31 as a reaction. As the first plate 100 applies pressure to the elastic member 31, the elastic member 31 may be compressed. Accordingly, the fourth thickness d4 of the elastic member 31 disposed on the top portion of the first jig 11 may begin to change to a fifth thickness d5 which is smaller than the fourth thickness d4.

In addition, a contact area between the first plate 100 and the elastic member 31 may expand gradually from the top portion of the elastic member 31 toward both sides of the elastic member 31. That is, the contact between the first plate 100 and the elastic member 31 may change from a line contact to a surface contact.

As the contact area between the first plate 100 and the elastic member 31 expands, the contact area between the adhesive layer 150 and the second plate 200 may also expand.

Referring to FIG. 9, the contact area between the second plate 200 and the adhesive layer 150 may expand gradually from the top portion of the elastic member 31 toward both sides of the elastic member 31. That is, as the second jig 20 continuously descends, the contact area between the elastic member 31 and the first plate 100 may expand, and, at the same time, the contact area between the second plate 200 and the adhesive layer 150 may expand. That is, the contact between the second plate 200 and the adhesive layer 150 may change from a line contact to a surface contact. Since the second plate 200 is attached to the adhesive layer 150 as the contact area between the second plate 200 and the adhesive layer 150 expands gradually, the formation of creases on the adhesive layer 150 can be prevented.

Referring to FIG. 10, as the second jig 20 descends continuously, the first plate 100 applies pressure more forcefully to the elastic member 31. As the pressure applied by the first plate 100 to the elastic member 31 increases, the contact area between the elastic member 31 and the first plate 100 may increase. Finally, the whole bottom surface of the first plate 100 may contact the elastic member 31, thereby completing the lamination of the first plate 100 and the second plate 200.

When the whole bottom surface of the first plate 100 contacts the elastic member 31, the thickness of the top portion 311 of the elastic member 31 disposed on the first jig 11 may be minimized to a sixth thickness d6. Here, the top and bottom surfaces of the elastic member 31 may be flat.

As the contact area between the first plate 100 and the elastic member 31 increases, the contact area between the second plate 200 and the adhesive layer 150 may also increase. Finally, the second plate 200 and the adhesive layer 150 may completely contact each other.

Subsequently, when the second jig 20 ascends and then the laminated structure is obtained, the elastic member 31 may return to its original shape and thickness.

Figure 11:
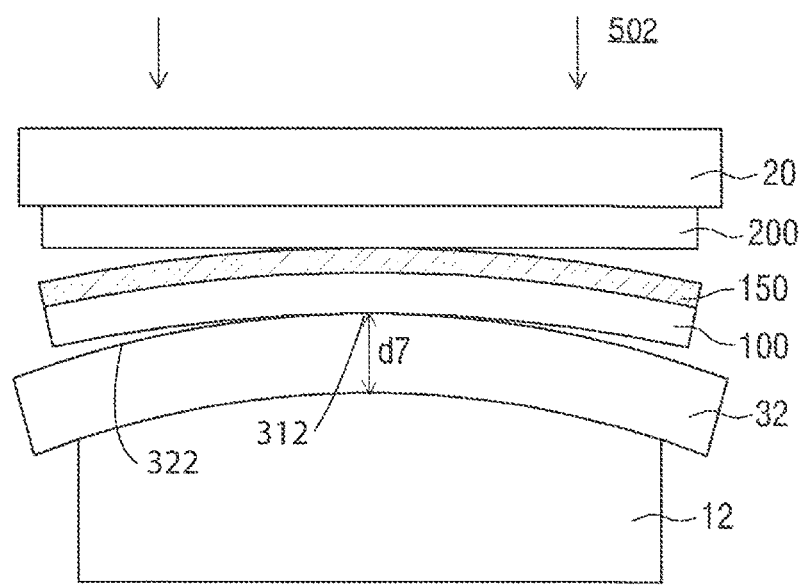
FIG. 11 is a cross-sectional view of a laminating apparatus according to another embodiment of the present invention.
Figure 12:
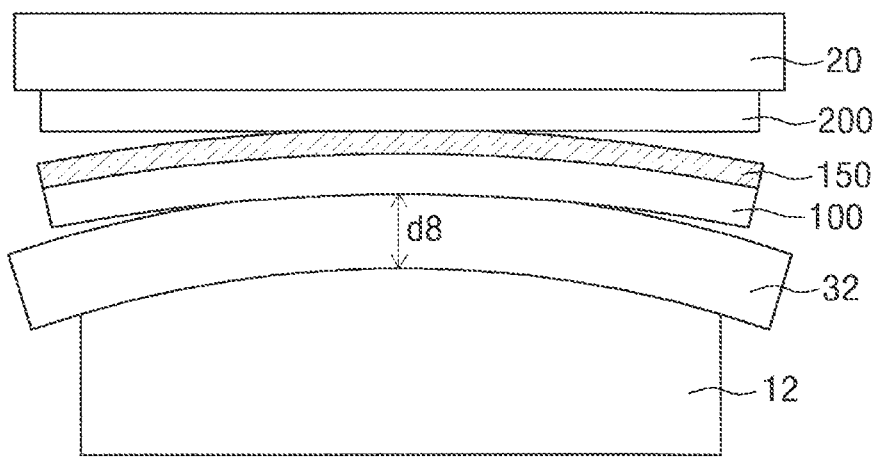
FIGS. 12 and 13 are cross-sectional views illustrating a laminating process performed using the laminating apparatus of FIG. 11.
Figure 12:
Figure 13:
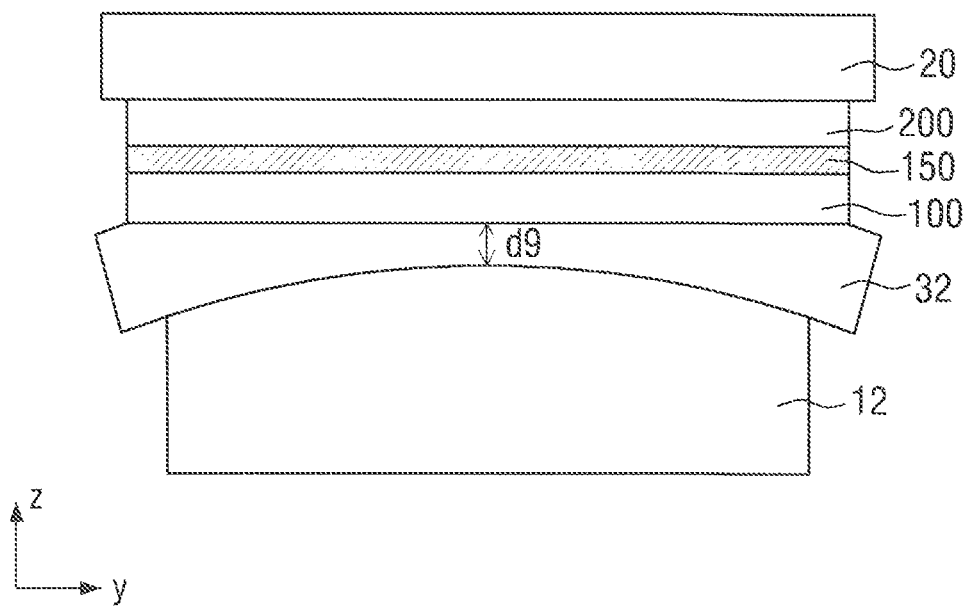

FIG. 11 is a cross-sectional view of a laminating apparatus 502 according to another embodiment of the present invention. FIGS. 12 and 13 are cross-sectional views illustrating a laminating process performed using the laminating apparatus 502 of FIG. 11. Referring to FIG. 11, the laminating apparatus 502 according to the current embodiment is different from the laminating apparatus 500 according to the embodiment of FIG. 1 in that a top surface of an elastic member 32 is curved.

Even if the top surface of the elastic member 32 is curved, it may also have a top portion 312 and curved sloping portions 322. In an exemplary embodiment, the elastic member 32 may have a uniform thickness. In this case, a top surface of a first jig 12 on which the elastic member 32 is placed may be curved such that the elastic member 32 can have the top portion 312 and the curved sloping portions 322. That is, the elastic member 32 may be bent along the shape of the top surface of the first jig 12. Accordingly, the top surface of the elastic member 32 may have the top portion 312 and the curved sloping portions 322. In some embodiments, a top portion of the first jig 12 and the top portion of the elastic member 32 may overlap each other.

As described above, a first plate 100 may be placed in the shape of an upwardly convex parabola having the top portion of the elastic member 32 as an inflection point. Even if the first plate 100 is bent downward from the top portion of the elastic member 32, both sides of the bent first plate 100 may be separated from the sloping portions of the elastic member 32. Specifically, the curvature of a parabola or curve formed by a bottom surface of the first plate 100 may be smaller than that of a parabola or curve formed by the top surface of the elastic member 32, such that both sides of the first plate 100 are separated from the sloping portions of the elastic member 32.

The laminating apparatus 501 according to the current embodiment may operate as follows. If the first plate 100 and an adhesive layer 150 disposed on the first plate 100 are bent downward from the top portion of the elastic member 32 as described above, a second plate 200 first contacts a portion (i.e., the highest portion) of the adhesive layer 150 disposed on the top portion 312 of the elastic member 32. In this case, the second plate 200 may line-contact the adhesive layer 150 disposed on the first plate 100.

A seventh thickness d7 of the elastic member 32 disposed on the top portion of the first jig 12, before the second plate 200 begins to apply pressure in earnest to the adhesive layer 150, may be substantially equal to a thickness of the elastic member 32 before the second plate 200 line-contacts the adhesive layer 150 as a second jig 20 descends.

When the second jig 20 descends further such that the second plate 200 applies more pressure to the adhesive layer 150, the thickness of the elastic member 32 placed on the top portion of the first jig 12 may be reduced, and a contact area between the second plate 200 and the adhesive layer 150 may increase. Specifically, when the second plate 200 applies pressure to the adhesive layer 150 and the first plate 100 as the second jig 20 descends further, the first plate 100 may apply pressure to the elastic member 32 as a reaction. As the first plate 100 applies pressure to the elastic member 32, the elastic member 32 may be compressed. Accordingly, the seventh thickness d7 of the elastic member 32 disposed on the top portion of the first jig 12 may be changed to an eighth thickness d8 which is smaller than the seventh thickness d7.

In addition, a contact area between the first plate 100 and the elastic member 32 may expand gradually from the top portion of the elastic member 32 toward both sides of the elastic member 32. That is, the contact between the first plate 100 and the elastic member 32 may change from a line contact to a surface contact.

As the contact area between the first plate 100 and the elastic member 32 expands, the contact area between the adhesive layer 150 and the second plate 200 may also expand.

Referring to FIG. 12, the contact area between the second plate 200 and the adhesive layer 150 may expand gradually from the top portion of the elastic member 32 toward both sides of the elastic member 32. That is, as the second jig 20 continuously descends, the contact area between the elastic member 32 and the first plate 100 may expand, and, at the same time, the contact area between the second plate 200 and the adhesive layer 150 may expand. That is, the contact between the second plate 200 and the adhesive layer 150 may change from a line contact to a surface contact. Since the second plate 200 is attached to the adhesive layer 150 as the contact area between the second plate 200 and the adhesive layer 150 expands gradually, the formation of creases on the adhesive layer 150 can be prevented.

Referring to FIG. 13, as the second jig 20 descends continuously, the first plate 100 applies pressure more forcefully to the elastic member 32. As the pressure applied by the first plate 100 to the elastic member 32 increases, the contact area between the elastic member 32 and the first plate 100 may increase. Finally, the whole bottom surface of the first plate 100 may contact the elastic member 32, thereby completing the lamination of the first plate 100 and the second plate 200.

When the whole bottom surface of the first plate 100 contacts the elastic member 32, the thickness of the elastic member 32 disposed on the top portion of the first jig 12 may be minimized to a ninth thickness d9. Here, the top surface of the elastic member 32 may be flat, and a bottom surface thereof may have a concave shape corresponding to the shape of the top surface of the first jig 12.

Subsequently, when the second jig 20 ascends and then the laminated structure is obtained, the elastic member 32 may return to its original shape and thickness.

Figure 14:
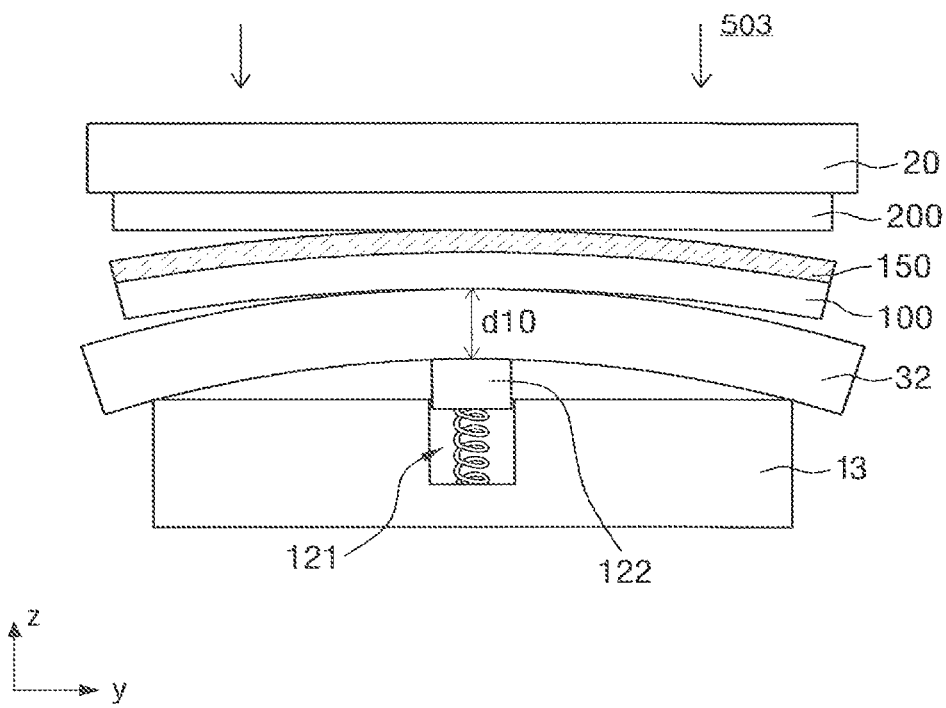
FIG. 14 is a cross-sectional view of a laminating apparatus according to another embodiment of the present invention.
Figure 15:
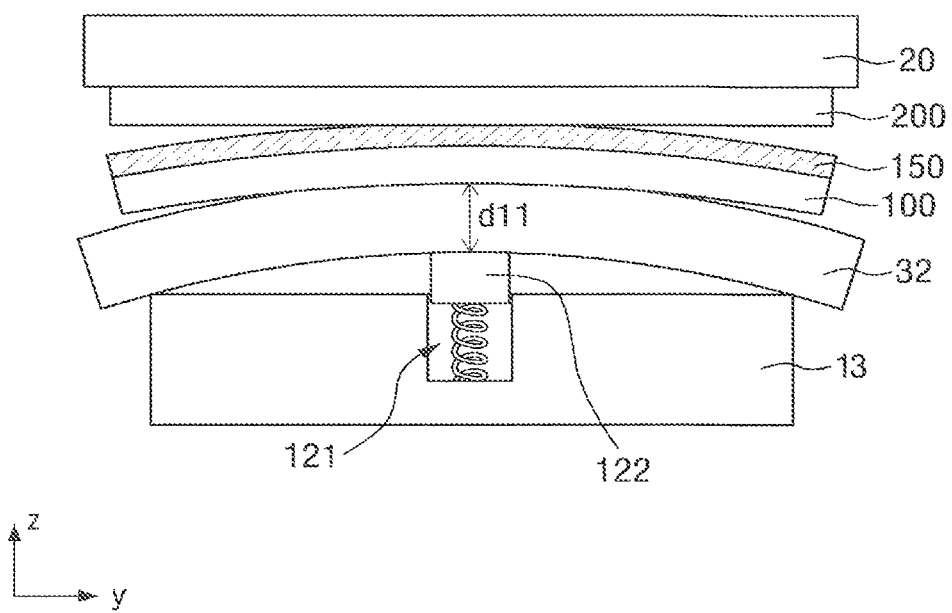
FIGS. 15 and 16 are cross-sectional views illustrating a laminating process performed using the laminating apparatus of FIG. 14.
Figure 16:
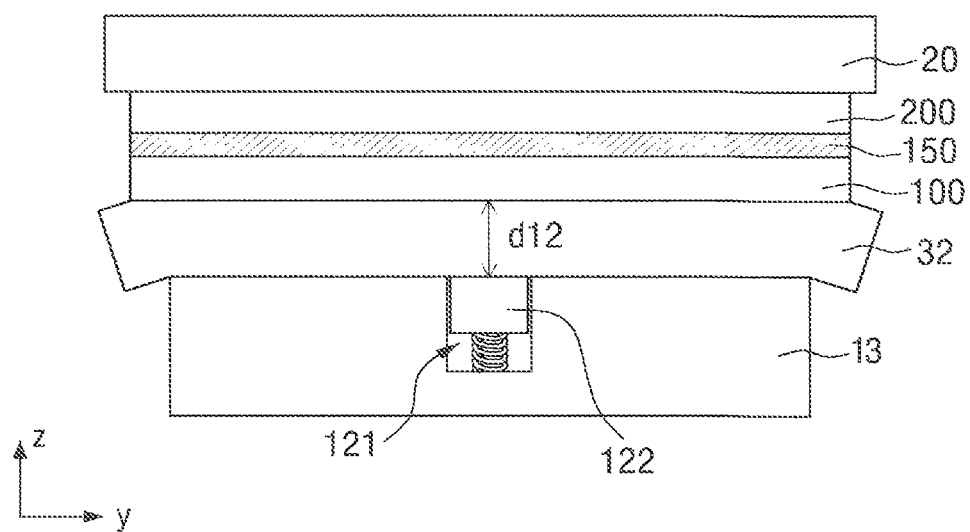

FIG. 14 is a cross-sectional view of a laminating apparatus 503 according to another embodiment of the present invention. FIGS. 15 and 16 are cross-sectional views illustrating a laminating process performed using the laminating apparatus 503 of FIG. 14.

Referring to FIG. 14, the laminating apparatus 503 according to the current embodiment is different from the laminating apparatus 502 according to the embodiment of FIG. 11 in that a first jig 13 includes a spring device 122 which protrudes a predetermined distance from a top surface of the first jig 13.

In an exemplary embodiment, the first jig 13 may include a recessed groove 121, and the spring device 122 may be at least partially inserted into the recessed groove 121.

As described above, in an exemplary embodiment, an elastic member 32 may have a uniform thickness. In this case, the first jig 13 may include the spring device 122 which protrudes the predetermined distance from the top surface of the first jig 13, such that the elastic member 32 can have a top portion 312 and curved sloping portions 322. That is, since the elastic member 32 is supported by the spring device 122 which protrudes the predetermined distance from the top surface of the first jig 13, a top surface of the elastic member 32 may have the top portion and the curved sloping portions.

The laminating apparatus 503 according to the current embodiment may operate as follows. If a first plate 100 and an adhesive layer 150 disposed on the first plate 100 are bent downward from the top portion of the elastic member 32 as described above, a second plate 200 first contacts a portion (i.e., a highest portion) of the adhesive layer 150 disposed on the top portion 312 of the elastic member 32. In this case, the second plate 200 may line-contact the adhesive layer 150 disposed on the first plate 100.

A tenth thickness d10 of the elastic member 32 disposed on a top portion of the first jig 13, before the second plate 200 begins to apply pressure in earnest to the adhesive layer 150, may be substantially equal to a thickness of the elastic member 32 before the second plate 200 line-contacts the adhesive layer 150 as a second jig 20 descends.

When the second jig 20 descends further such that the second plate 200 applies more pressure to the adhesive layer 150, the thickness of the elastic member 32 may be reduced, and a contact area between the second plate 200 and the adhesive layer 150 may increase. Specifically, when the second plate 200 applies pressure to the adhesive layer 150 and the first plate 100 as the second jig 20 descends further, the first plate 100 may apply pressure to the elastic member 32 as a reaction. As the first plate 100 applies pressure to the elastic member 32, the elastic member 32 may be compressed and, at the same time or subsequently, the elastic member 32 may apply pressure to the spring device 122. Accordingly, the tenth thickness d10 of the elastic member 32 disposed on the top portion of the first jig 13 may be changed to an eleventh thickness d11 which is smaller than the tenth thickness d10. Moreover, as the elastic member 32 applies pressure to the spring device 122, a height from the top surface of the first jig 13 to the top surface of the elastic member 32 may be reduced.

Referring to FIG. 15, the contact area between the second plate 200 and the adhesive layer 150 may expand gradually from the top portion of the elastic member 32 toward both sides of the elastic member 32.

As the first plate 100 applies pressure to the elastic member 32, the thickness of the elastic member 32 may be reduced. In addition, as the elastic member 32 applies pressure to the spring device 122 at the same time as or subsequent to the reduction in the thickness of the elastic member 32 by the pressure applied to the elastic member 32, the height from the top surface of the first jig 13 to the top portion of the elastic member 32 may be reduced. Accordingly, the contact area between the adhesive layer 150 and the second plate 200 may expand.

Referring to FIG. 16, as the second jig 20 descends continuously, the first plate 100 applies pressure more forcefully to the elastic member 32. As the pressure applied by the first plate 100 to the elastic member 32 increases, the pressure applied by the elastic member 32 to the spring device 122 may increase. Finally, the spring device 122 is completely inserted into the recessed groove 121, and thus the whole bottom surface of the first plate 100 contacts the elastic member 32, thereby completing the lamination of the first plate 100 and the second plate 200. When the whole bottom surface of the first plate 100 contacts the elastic member 32, the thickness of the elastic member 32 disposed on the top portion of the first jig 13 may be minimized to a twelfth thickness d12.

Subsequently, when the second jig 20 ascends and then the laminated structure is obtained, the elastic member 32 and the spring device 122 may return to their original shape and thickness.

Figure 17:
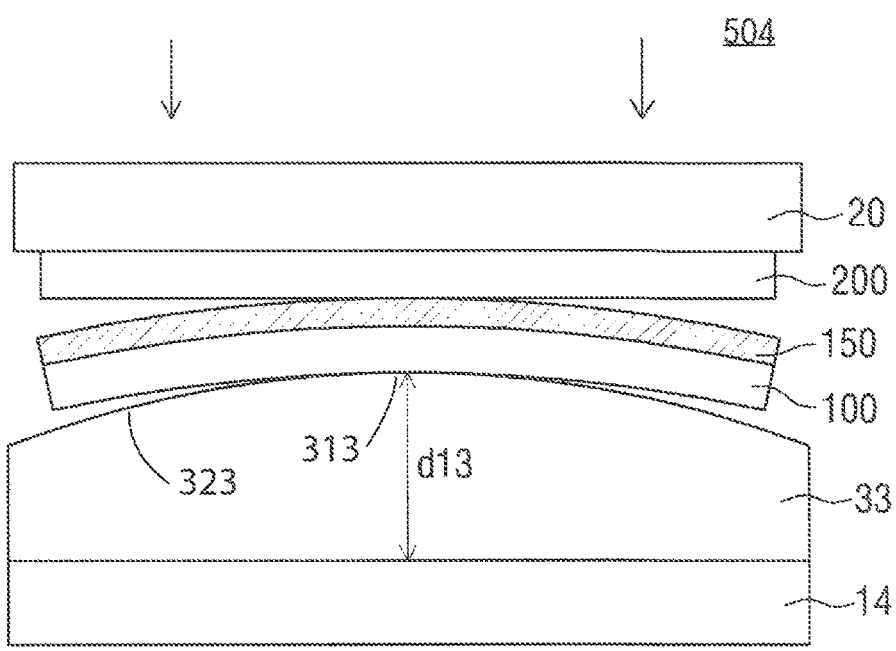
FIG. 17 is a cross-sectional view of a laminating apparatus according to another embodiment of the present invention.
Figure 18:
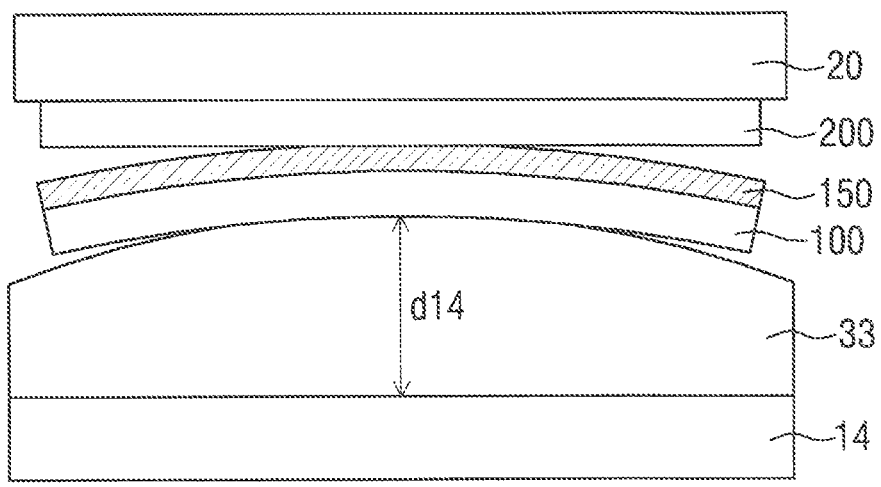
FIGS. 18 and 19 are cross-sectional views illustrating a laminating process performed using the laminating apparatus of FIG. 17.
Figure 19:
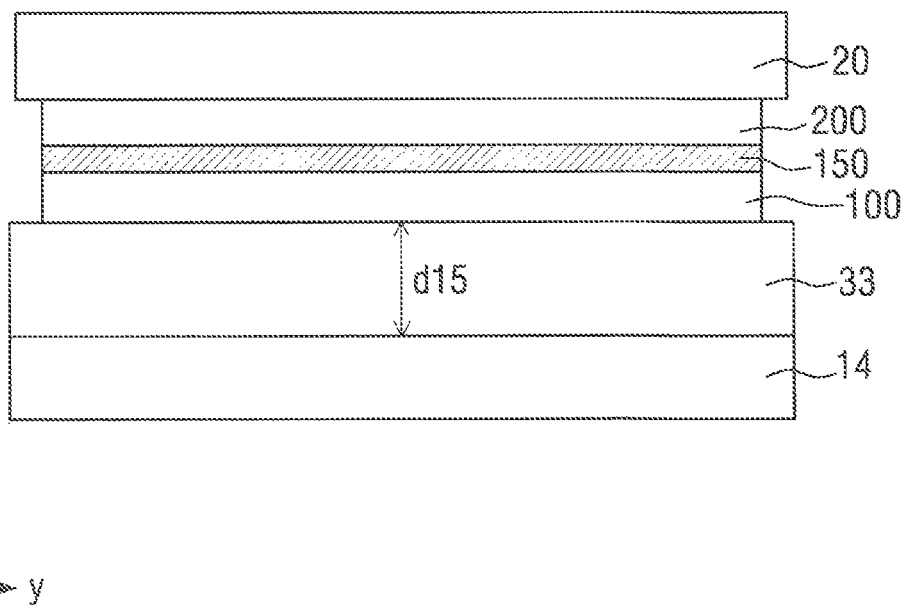

FIG. 17 is a cross-sectional view of a laminating apparatus 504 according to another embodiment of the present invention. FIGS. 18 and 19 are cross-sectional views illustrating a laminating process performed using the laminating apparatus 504 of FIG. 17. Referring to FIG. 17, the laminating apparatus 504 according to the current embodiment is different from the laminating apparatus 502 according to the embodiment of FIG. 11 in that a top portion 313 of an elastic member 33 is thicker than sloping portions 323 thereof.

As described above, a top surface of the elastic member 33 may include the top portion 313 and the sloping portions 323 which slope downward from the top portion 313 on both sides of the top portion. In an exemplary embodiment, a top surface of a first jig 14 on which the elastic member 33 is placed may be flat. In this case, the elastic member 33 may have a non-uniform thickness so as to have the top portion and the sloping portions. That is, the top portion 313 of the elastic member 33 may be thickest, and the thickness of the elastic member 33 may be reduced while approaching from the top portion 313 toward both sides of the elastic member 33.

The laminating apparatus 504 according to the current embodiment may operate as follows. If a first plate 100 and an adhesive layer 150 disposed on the first plate 100 are bent downward from the top portion of the elastic member 33 as described above, a second plate 200 first contacts a portion (i.e., the highest portion) of the adhesive layer 150 disposed on the top portion 313 of the elastic member 33. In this case, the second plate 200 may line-contact the adhesive layer 150 disposed on the first plate 100.

A thirteenth thickness d13 of the elastic member 33 disposed on a top portion of the first jig 14, before the second plate 200 begins to apply pressure in earnest to the adhesive layer 150, may be substantially equal to a thickness of the elastic member 33 before the second plate 200 line-contacts the adhesive layer 150 as a second jig 20 descends.

When the second jig 20 descends further such that the second plate 200 applies more pressure to the adhesive layer 150, the thickness of the elastic member 33 placed on the top portion of the first jig 14 may be reduced, and a contact area between the second plate 200 and the adhesive layer 150 may increase. Specifically, when the second plate 200 applies pressure to the adhesive layer 150 and the first plate 100 as the second jig 20 descends further, the first plate 100 may apply pressure to the elastic member 33 as a reaction. As the first plate 100 applies pressure to the elastic member 33, the elastic member 33 may be compressed. Accordingly, the thirteenth thickness d13 of the elastic member 33 disposed on the top portion of the first jig 14 may be changed to a fourteenth thickness d14 which is smaller than the thirteenth thickness d13.

In addition, a contact area between the first plate 100 and the elastic member 33 may expand gradually from the top portion of the elastic member 33 toward both sides of the elastic member 33. That is, the contact between the first plate 100 and the elastic member 33 may change from a line contact to a surface contact. As the contact area between the first plate 100 and the elastic member 33 expands, the contact area between the adhesive layer 150 and the second plate 200 may also expand.

Referring to FIG. 18, the contact area between the second plate 200 and the adhesive layer 150 may expand gradually from the top portion of the elastic member 33 toward both sides of the elastic member 33. That is, as the second jig 20 continuously descends, the contact area between the elastic member 31 and the first plate 100 may expand, and, at the same time, the contact area between the second plate 200 and the adhesive layer 150 may expand. That is, the contact between the second plate 200 and the adhesive layer 150 may change from a line contact to a surface contact. Since the second plate 200 is attached to the adhesive layer 150 as the contact area between the second plate 200 and the adhesive layer 150 expands gradually, the formation of creases on the adhesive layer 150 can be prevented.

Referring to FIG. 19, as the second jig 20 descends continuously, the first plate 100 applies pressure more forcefully to the elastic member 33. As the pressure applied by the first plate 100 to the elastic member 33 increases, the contact area between the elastic member 33 and the first plate 100 may increase. Finally, the whole bottom surface of the first plate 100 may contact the elastic member 33, thereby completing the lamination of the first plate 100 and the second plate 200.

When the whole bottom surface of the first plate 100 contacts the elastic member 33, the thickness of the elastic member 33 disposed on the top portion of the first jig 14 may be minimized to a fifteenth thickness d15. Here, the top and bottom surfaces of the elastic member 33 may be flat. As the contact area between the first plate 100 and the elastic member 33 increases, the contact area between the second plate 200 and the adhesive layer 150 may also increase. Finally, the second plate 200 and the adhesive layer 150 may completely contact each other.

Subsequently, when the second jig 20 ascends and then the laminated structure is obtained, the elastic member 33 may return to its original shape and thickness.

Figure 20:
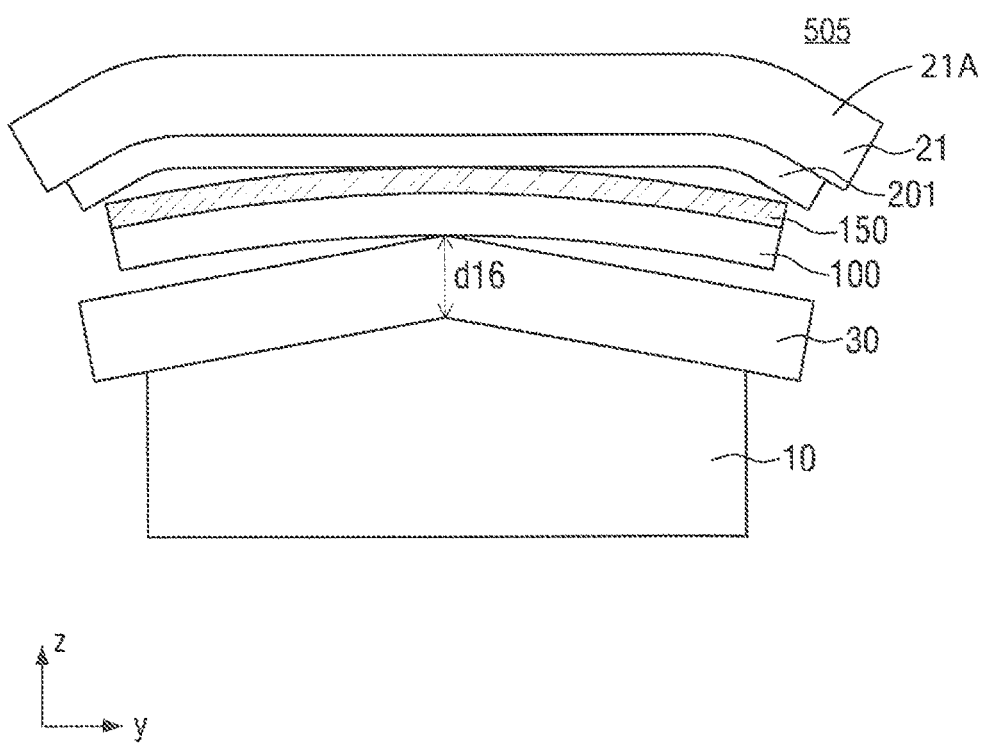
FIG. 20 is a cross-sectional view of a laminating apparatus according to another embodiment of the present invention.
Figure 21:
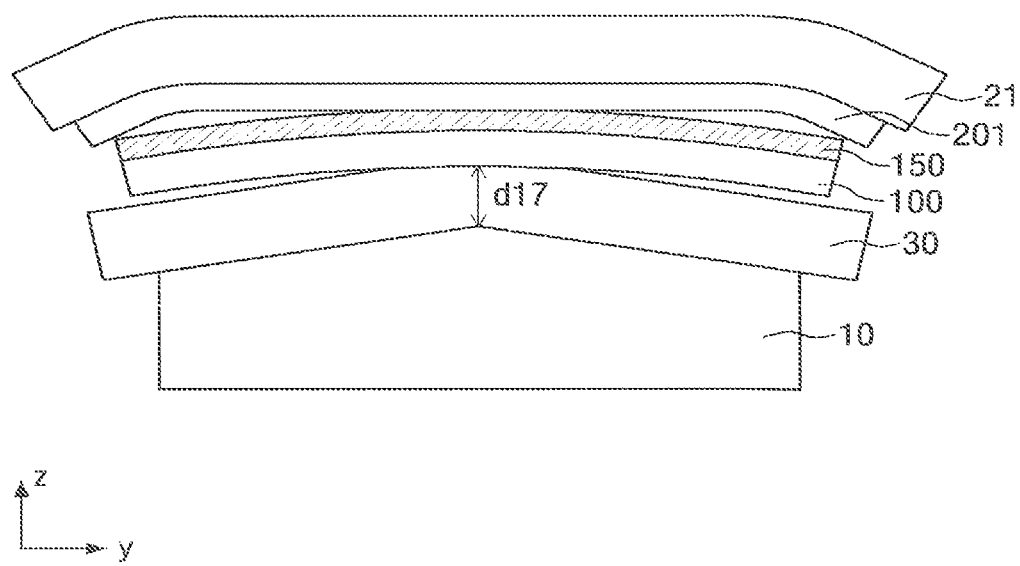
FIGS. 21 and 22 are cross-sectional views illustrating a laminating process performed using the laminating apparatus of FIG. 20.
Figure 22:
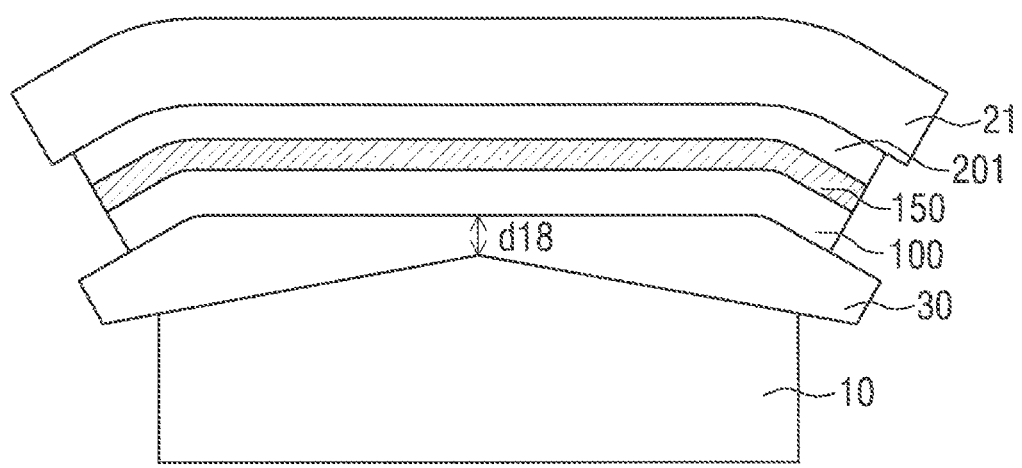

FIG. 20 is a cross-sectional view of a laminating apparatus 505 according to another embodiment of the present invention. FIGS. 21 and 22 are cross-sectional views illustrating a laminating process performed using the laminating apparatus 505 of FIG. 20. Referring to FIG. 20, in the laminating apparatus 505 according to the current embodiment, a second jig 21 has bent portions at both sides thereof.

A second plate 201 disposed on the second jig 21 may also have bent portions at both edge sides thereof. For example, the second plate 201 may be a 3-dimensional window having bent portions at both edge sides thereof.

If the second plate 201 has bent portions, the second jig 21 may have bent edge portions 21A corresponding to the bent portions of the second plate 201. That is, the bent portions of the second jig 21 have the same shape as the bent portions of the second plate 201, such that the second jig 21 and the second plate 201 can completely overlap each other.

The laminating apparatus 505 according to the current embodiment may operate as follows. If a first plate 100 and an adhesive layer 150 disposed on the first plate 100 are bent downward from a top portion of an elastic member 30 as described above, the second plate 201 first contacts a portion (i.e., the highest portion) of the adhesive layer 150 disposed on the top portion of the elastic member 30. In this case, the second plate 201 may line-contact the adhesive layer 150 disposed on the first plate 100.

A sixteenth thickness d16 of the elastic member 30 disposed on a top portion of a first jig 10 before the second plate 201 begins to apply pressure in earnest to the adhesive layer 150 may be substantially equal to a thickness of the elastic member 30 before the second plate 201 line-contacts the adhesive layer 150 as the second jig 21 descends.

When the second jig 21 descends further such that the second plate 201 applies more pressure to the adhesive layer 150, the thickness of the elastic member 30 placed on the top portion of the first jig 10 may be reduced, and a contact area between the second plate 201 and the adhesive layer 150 may increase. Specifically, when the second plate 201 applies pressure to the adhesive layer 150 and the first plate 100 as the second jig 21 descends further, the first plate 100 may apply pressure to the elastic member 30 as a reaction. As the first plate 100 applies pressure to the elastic member 30, the elastic member 30 may be compressed. Accordingly, the sixteenth thickness d16 of the elastic member 30 disposed on the top portion of the first jig 10 may be changed to a seventeenth thickness d17 which is smaller than the sixteenth thickness d16.

In addition, a contact area between the first plate 100 and the elastic member 30 may expand gradually from the top portion of the elastic member 30 toward both sides of the elastic member 30. That is, the contact between the first plate 100 and the elastic member 30 may change from a line contact to a surface contact. As the contact area between the first plate 100 and the elastic member 30 expands, the contact area between the adhesive layer 150 and the second plate 201 may also expand.

Referring to FIG. 21, the contact area between the second plate 201 and the adhesive layer 150 may expand gradually from the top portion of the elastic member 30 toward both sides of the elastic member 30. That is, as the second jig 21 continuously descends, the contact area between the elastic member 30 and the first plate 100 may expand, and, at the same time, the contact area between the second plate 201 and the adhesive layer 150 may expand. That is, the contact between the second plate 201 and the adhesive layer 150 may change from a line contact to a surface contact. Since the second plate 201 is attached to the adhesive layer 150 as the contact area between the second plate 201 and the adhesive layer 150 expands gradually, the formation of creases on the adhesive layer 150 can be prevented.

Referring to FIG. 22, as the second jig 21 descends continuously, the first plate 100 applies pressure more forcefully to the elastic member 30. As the pressure applied by the first plate 100 to the elastic member 30 increases, the contact area between the elastic member 30 and the first plate 100 may increase. Finally, the whole bottom surface of the first plate 100 may contact the elastic member 30, thereby completing the lamination of the first plate 100 and the second plate 201.

When the whole bottom surface of the first plate 100 contacts the elastic member 30, the thickness of the elastic member 30 disposed on the top portion of the first jig 10 may be minimized to an eighteenth thickness d18. Here, a top surface of the elastic member 30 may be convex, and a bottom surface of the elastic member 30 may be concave.

As the contact area between the first plate 100 and the elastic member 30 increases, the contact area between the second plate 201 and the adhesive layer 150 may also increase. Finally, the second plate 201 and the adhesive layer 150 may completely contact each other.

Subsequently, when the second jig 21 ascends and then the laminated structure is obtained, the elastic member 30 may return to its original shape and thickness.

Embodiments of the present invention provide at least one of the following advantages.

That is, the formation of creases on an adhesive layer can be prevented by gradually attaching a second plate to the adhesive layer.

Furthermore, process efficient and product productivity can be improved by reducing a product defect rate.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A laminating apparatus, comprising:
   a first jig;
   an elastic member which is disposed on the first jig, a top surface of the elastic member comprising a top portion and sloping portions sloping downward from the top portion; and
   a second jig which is separated from the first jig by a predetermined distance and faces the first jig, wherein the second jig comprises a flat surface which faces the first jig, and the second jig has bent portions at both edge sides thereof.

2. The laminating apparatus of claim 1, wherein a thickness of the elastic member is uniform.

3. The laminating apparatus of claim 2, wherein the first jig comprises a top portion and sloping portions that slope downward from the top portion, a thickness of the top portion of the first jig being different from the thicknesses of the sloping portions of the first jig.

4. The laminating apparatus of claim 1, wherein a top surface of the first jig is flat, and the top portion of the elastic member has a different thickness from thicknesses of the sloping portions of the elastic member.

5. The laminating apparatus of claim 1, wherein a bottom surface of the elastic member has the same shape as the top surface of the first jig.

6. The laminating apparatus of claim 1, wherein the sloping portions are curved.

7. The laminating apparatus of claim 1, further comprising a spring device which protrudes a predetermined distance from the top surface of the first jig, the elastic member being supported by the spring device.

8. A laminating method, comprising:
   placing a first plate on a jig assembly that comprises a first jig and an elastic member which comprises a top portion and sloping portions sloping downward from the top portion;
   placing a second plate on a second jig which is placed to face the first jig, an adhesive layer being disposed between the first plate and the second plate, wherein the second jig is separated from the first jig by a predetermined distance and faces the first jig, wherein the second jig comprises a flat surface which faces the first jig, and the second jig has bent portions at both edge sides thereof;
   bringing the second plate into contact with the adhesive layer by making the jig assembly and the second jig approach each other; and
   attaching the first plate and the second plate to each other by making the jig assembly and the second jig approach closer to each other in a state that the second plate and the adhesive layer are in the contact with each other.

9. The laminating method of claim 8, wherein a contact area between the second plate and the adhesive layer increases gradually.

10. The laminating method of claim 9, wherein as the contact area between the second plate and the adhesive layer increases gradually, the first plate applies pressure to the elastic member thereby to reduce a thickness of the top portion of the elastic member.

11. The laminating method of claim 8, wherein the second plate has bent portions at both edge sides thereof.

12. The laminating method of claim 11, wherein the first plate is a flexible panel, and the second plate is a window.

* * * * *